United States Patent
Tauvron et al.

(10) Patent No.: US 7,531,935 B2
(45) Date of Patent: May 12, 2009

(54) POLYPHASE ELECTRICTURNING MACHINE SUCH AS AN ALTERNATOR OR AN ALTERNO-STARTER, PARTICULAR FOR A MOTOR VEHICLE

(75) Inventors: Fabrice Tauvron, Athis-Mons (FR); Olivier Gas, Le Vésinet (FR)

(73) Assignee: Valeo Equipements Electriques Moteur, Creteil Cedex (FR)

( * ) Notice: Subject to any disclaimer, the term of this patent is extended or adjusted under 35 U.S.C. 154(b) by 354 days.

(21) Appl. No.: 10/570,632

(22) PCT Filed: Sep. 3, 2004

(86) PCT No.: PCT/FR2004/002214

§ 371 (c)(1),
(2), (4) Date: Mar. 3, 2006

(87) PCT Pub. No.: WO2005/029679

PCT Pub. Date: Mar. 31, 2005

(65) Prior Publication Data

US 2006/0284510 A1     Dec. 21, 2006

(30) Foreign Application Priority Data

Sep. 5, 2003 (FR) .................................. 03 10545

(51) Int. Cl.
*H02K 3/28* (2006.01)
(52) U.S. Cl. ...................... 310/184; 310/180
(58) Field of Classification Search ............. 310/180, 310/184
See application file for complete search history.

(56) References Cited

U.S. PATENT DOCUMENTS

| | | | | |
|---|---|---|---|---|
| 5,122,705 A | * | 6/1992 | Kusase et al. ............. | 310/68 D |
| 5,274,322 A | | 12/1993 | Hayashi et al. | |
| 5,449,962 A | * | 9/1995 | Shichijyo et al. ............ | 310/184 |
| 5,686,774 A | * | 11/1997 | Slavik et al. ................ | 310/198 |
| 5,691,590 A | * | 11/1997 | Kawai et al. ................ | 310/180 |
| 6,034,464 A | | 3/2000 | Asao | |
| 2002/0175589 A1 | | 11/2002 | Takizawa et al. | |

FOREIGN PATENT DOCUMENTS

| | | |
|---|---|---|
| EP | 0 240 644 | 10/1987 |
| EP | 0 454 039 | 10/1991 |
| FR | 2737063 | 1/1997 |
| FR | 2741912 | 6/1997 |

* cited by examiner

*Primary Examiner*—Burton Mullins
(74) *Attorney, Agent, or Firm*—Bernenato, White & Stavish, LLC

(57) ABSTRACT

A polyphase electric turning machine such as an alternator or an alterno-starter, particularly for a motor vehicle. The machine comprises a stator surrounding a rotor inside a case; the stator comprises a three-phase star-shaped winding and a triangular three-phase winding whose outputs are connected to rectifier bridges which are parallel mounted between the ground and a common output terminal. The two windings are received together in the recesses of the stator. The number of star-shaped winding spires and triangular winding spires in the machine is selected in such a way that the number of spires of each winding is respectively 3.

4 Claims, 2 Drawing Sheets

POLYPHASE ELECTRIC TURNING MACHINE SUCH AS AN ALTERNATOR OR AN ALTERNO-STARTER, PARTICULAR FOR A MOTOR VEHICLE

FIELD OF THE INVENTION

The invention concerns a multiphase rotary electrical machine such as an alternator or alternator/starter, in particular for a motor vehicle, of the type comprising, within a casing, a stator surrounding a rotor, the stator comprising a three-phase star winding and a three-phase delta winding, the outputs of which are connected to bridge rectifiers connected in parallel between earth and the output terminal of the rotary electrical machine, the two windings being received together in recesses in the stator.

These two three-phase windings, one connected in a star, the other connected in a delta, form a composite winding stator device.

BACKGROUND OF THE INVENTION

A rotary electrical machine of this type is known through the French patent number 2 737 063, to which reference can be made for more details. So that the voltages produced by the two three-phase windings, one connected in a star and the other connected in a delta, are identical, it is indicated that the turns of the delta winding must be $\sqrt{3}$ times the number of the turns on the star winding. It is also stated that the ratio of the cross sections of the turns of the two windings must be $1/\sqrt{3}$.

The prior art is thus limited to stating a few specific positive effects procured by the composite winding stator device.

SUMMARY OF THE INVENTION

The aim of the invention is to go further by proposing possibilities for optimising the performance of a rotary electrical machine as defined above, by virtue of the composite winding stator device.

To achieve this aim, the rotary electrical machine according to the invention in which the ratio of the number of turns of the star and delta windings is chosen so that the number of turns in each winding are integer numbers, whilst keeping the ratio of these numbers as close as possible to $\sqrt{3}$, is characterised in that the number of turns on the star winding and the number of turns on the delta winding are respectively 3 and 5.

According to yet another characteristic, the diameter of the wire in the star winding is different from the wire in the delta winding and the ratio of the diameters is chosen so as to be close to the optimum ratio of $\sqrt{3}$ of the resistances of the windings, and the diameters of the star and delta stator windings are chosen so as to obtain a fill factor of the recesses greater than 50%.

According to yet another characteristic of the invention, the star windings formed by two wires in parallel, advantageously wound in distributed mode.

According to yet another advantageous characteristic of the invention, the turns of the star winding of a stator recess are disposed at the recess opening, distributed, whilst the turns on the delta winding are in the bottom of the recess.

According to yet another advantageous characteristic of the invention, in a rotor comprising pairs of poles and permanent magnets, the number of magnets is less than the number of poles and the magnets are disposed symmetrically at the centre of the rotor.

Naturally these advantageous characteristics can be considered in isolation or in combination.

BRIEF DESCRIPTION OF THE DRAWINGS

The invention will be understood better, and other aims, characteristics, details and advantages thereof will emerge more clearly in the course of the following explanatory description made with reference to the accompanying drawings given solely by way of example illustrating one embodiment of the invention and in which.

DESCRIPTION OF THE PREFERRED EMBODIMENTS

Figure 1:
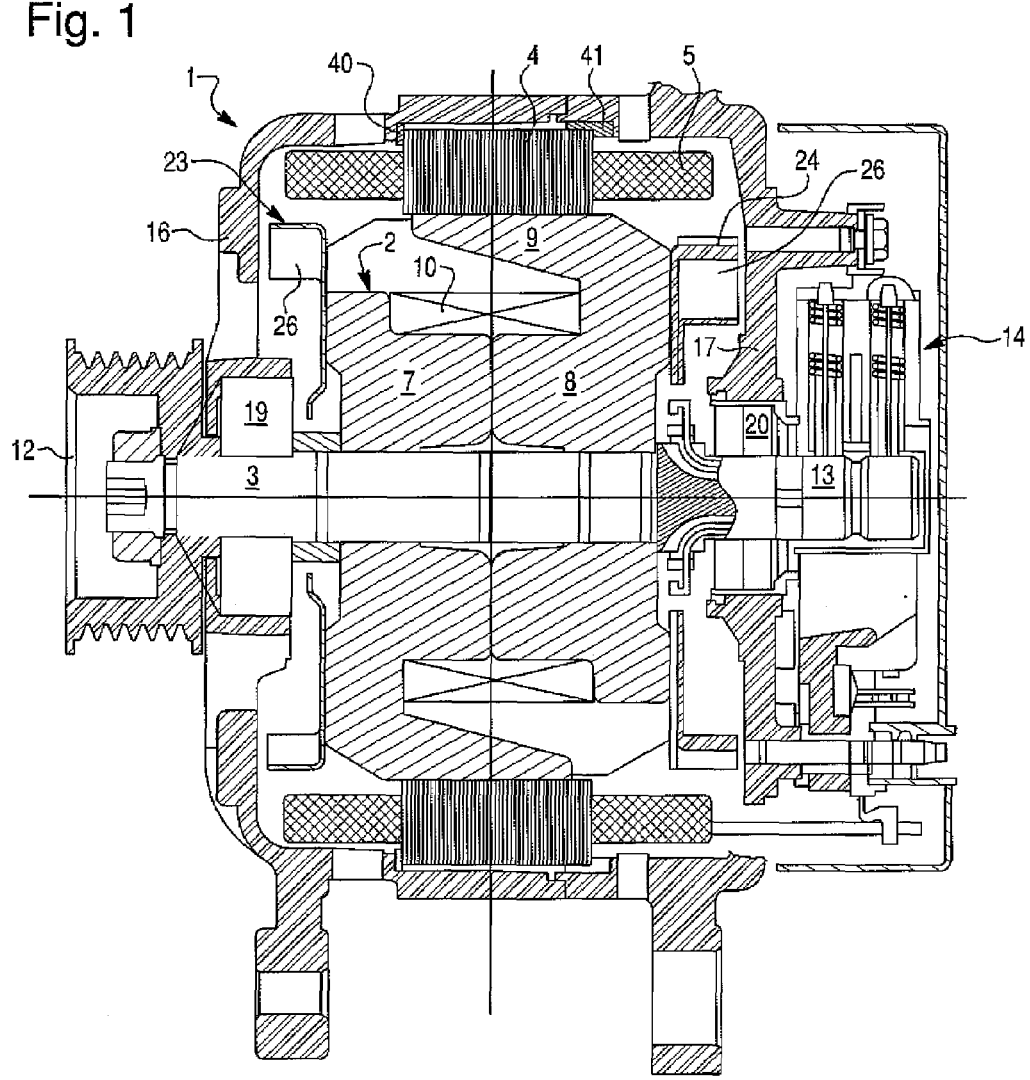
FIG. 1 is a view in axial section of a rotary electrical machine of the prior art.

Referring to FIG. 1, a rotary electrical machine is described below briefly, in the present case an alternator here of the three-phase type, in particular for a motor vehicle with a thermal engine, of the prior art, to which the invention is applicable. Naturally the alternator can be reversible and consist of an alternator/starter in particular for starting the thermal engine of the vehicle. When the machine is functioning in alternator mode it transforms mechanical energy into electrical energy like any alternator. When the machine is functioning in electric motor mode, in particular in starter mode for starting the thermal engine of the motor vehicle, it transforms electrical energy into mechanical energy.

This machine comprises essentially a casing 1 and, inside it, a rotor 2 rotationally fixed to a shaft 3 and a stator 4 which surrounds the rotor and comprises a body in the form of a packet of metal sheets provided with recesses, here of the semi-closed type, for mounting stator windings forming on each side of it a leading-out wire indicated at 5. These windings comprise here a three-phase star winding and a three-phase delta winding arranged as described below so as to form a composite winding stator device.

The rotor is produced in the example depicted in the form of a claw rotor, as described for example in the documents US 2002/0175589 A1 and EP 0 454 039 A1, comprising two pole wheels 7, 8 axially juxtaposed and each having a transfer flange provided at its external periphery with trapezoidal-shaped teeth 9 directed axially towards the flange of the other pole wheel, the tooth of one pole wheel entering the space between two adjacent teeth 9 on the other pole wheel, so that the teeth on the pole wheels are interlocked. An excitation winding 10 is located axially between the flanges and the pole wheels 7, 8. It is carried by a rotor part in the form of a cylindrical core, which could be distinct from the flanges or be in two parts each belonging to one of the flanges as depicted in FIG. 1. When the excitation winding 10 is activated, that is to say electrically supplied, the rotor made from ferromagnetic material is magnetised and becomes an inductor rotor with the formation of magnetic poles at the teeth on the pole wheels.

This inductor rotor creates an induced alternating current in the armature stator when the shaft 3 rotates.

In a variant, the rotor can be of the projecting pole type, as described for example in WO 02/054566, and then comprises several excitation windings each wound round such a pole.

The shaft 3 of the rotor 2 carries at its front end a pulley 12 belonging to a movement transmission device with at least one belt between the alternator and the thermal engine of the motor vehicle and at its rear end 13 collector rings connected by cabled connections to the ends of the excitation windings of the rotor. Brushes belong to a brush holder depicted in a general fashion at 14 and are disposed so as to rub on the collector rings. The brush holder is connected to a voltage regulator.

The casing 1 is in two parts, namely a front bearing 16 adjacent to the pulley 12 and a rear bearing 17 carrying the brush holder, the voltage regulator and bridge rectifiers described below. The bearings are hollow in shape and each comprise centrally a ball bearing respectively 19 and 20 for the rotational mounting of the shaft 2 of the rotor 3. The bearings are, in the machine shown, perforated so as to allow the cooling of the alternator by the circulation of air. To this end, the rotor carries at least at one of its axial ends a fan intended to provide this circulation of air. In the example depicted, a fan denoted 23 is provided on the front face of the rotor and another fan 24, more powerful, at the rear face, each fan being provided with a plurality of blades indicated at 25 and 26. In a variant, the alternator can be cooled by water, the casing then being configured so as to comprise a suitable water circulation channel.

Figure 2:
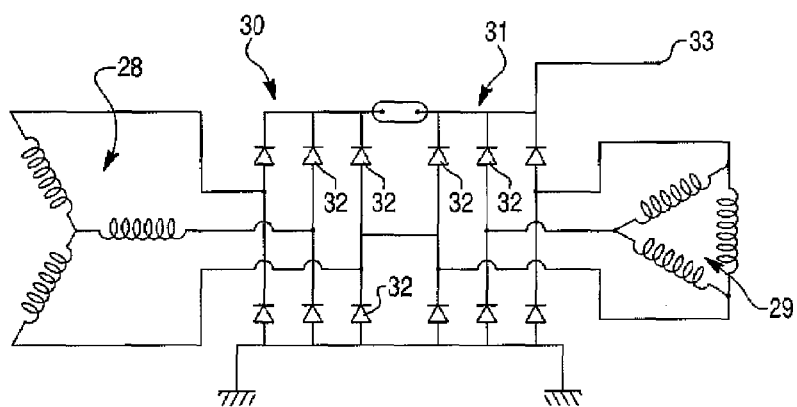
FIG. 2 illustrates the electrical diagram of a rotary electrical machine where the stator winding comprises a three-phase star winding and a three-phase delta winding, according to the prior art.

A rotary electrical machine of the type depicted in FIG. 2 and to which the invention is applicable comprises a composite winding stator device which comprises, as depicted in FIG. 2, a three-phase star winding 28 and a three-phase delta winding 29, the outputs of which are connected to bridge rectifiers respectively 30 and 31 comprising rectifying elements such as diodes 32 or transistors of the MOSFET type, in particular when the machine is of the reversible type and consists of an alternator/starter as described for example in the document FR A 2 745 445 (U.S. Pat. No. 6,002,219).

Thus (FIG. 2) each three-phase winding comprises three arms each consisting a winding of a phase.

The three-phase star winding comprises three arms connected in a star and therefore a common input and three outputs electrically connected to the bridge 30.

The three-phase delta winding comprises three arms connected in a triangle, that is to say electrically connected in pairs to each of the vertices of the triangle. Each vertex constituting an input. The outputs of this three-phase winding are electrically connected to the bridge 31.

The bridge rectifiers are connected in parallel between earth and the DC output terminal 33.

Figure 3:
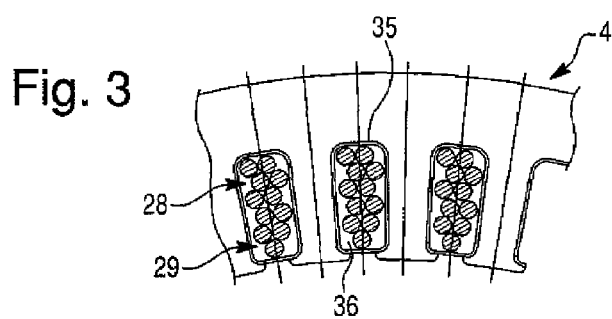
FIG. 3 is a view in section, with cutaway, of the stator of a rotary electrical machine according to the invention.

These bridges are carried by the rear bearing 17 of the alternator, as can be seen for example in FIG. 3 of the document FR A 2 737 063.

The bridges are full-wave bridges of the Graetz type. These bridges make it possible in particular to rectify the alternating current produced in the windings of the stator into DC current, in particular to charge the battery of the motor vehicle.

So that the voltages delivered by the two windings are substantially identical, the number of turns on the delta winding 29 is $\sqrt{3}$ times greater than the number of turns on the star winding 28. The ratio between the cross sections of the turns on the delta winding and the turns on the star winding is $1/\sqrt{3}$.

Given that the diagram in FIG. 2 is known, for example through French patent number 2 737 063, it will not be described below in any further detail.

As can be seen in FIG. 3, the turns on the star 28 and delta 29 windings are disposed in the same recesses denoted 35, the turns on the delta winding being placed close to the opening 36 of the recesses, whilst the turns of the star winding 28 are placed in the bottom.

It should be noted that, in the example embodiment described, the rotor 2 (FIG. 4) comprises eight teeth 9 per pole wheel and therefore eight pairs of poles. There are therefore provided 48 recesses in the body of the stator, that is to say half the number of notches as in the solution described in the aforesaid documents US 2002/0175589 A1 and EP 0 454 039 A1. Naturally the rotor can, according to the applications, comprise 6, 7, 10 or 12 pairs of poles and the stator 36, 42, 60 or 72 pairs of poles.

In a known fashion, it being a case of a three-phase winding between two successive recesses receiving a first arm of the winding, two recesses are provided for receiving respectively the second and third arm of the winding.

It should also be noted that each recess 35 comprises, in a known manner, a recess insulator, not referenced, in order to insulate the wires of the windings with respect to the body of the stator, and that the opening 36 of each recess 35 is sufficiently wide to allow the wires of the windings to pass. This entrance is, in a known manner, closed by a recess chock, not referenced. This chock is advantageously elastic in order to exert a clamping action on the wires of the windings.

The aim of the invention is to improve rotary electrical machines of the type shown in FIGS. 1 and 2 by optimising their performance, in particular by virtue of a suitable configuration of the composite winding stator device, and additional constructional measures, as will be described below.

The invention is essentially based on the discovery that the choice of the number of turns received in each recess of the stator, of the star 28 and delta 29 windings, have a considerable impact on the performance of the machine.

In the context of the invention, it has been found that, in order to obtain optimum thermal conditions, the number of turns must be as small as possible but that the ratio of the number of turns of the delta winding with respect to the turns on the star winding must be as close as possible to the optimum value of $\sqrt{3}$.

Figure 5:
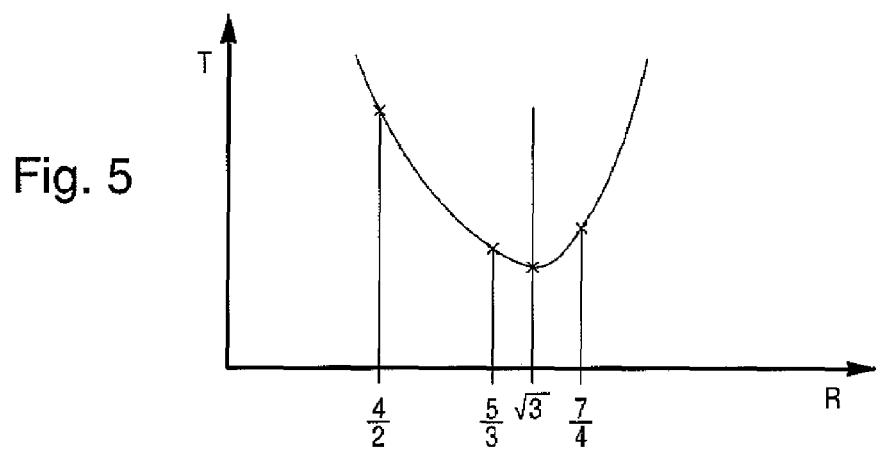
FIG. 5 is a curve representing the thermal state T of the machine as a function of the ratio R of the numbers of turns on the star and delta windings.

Measurements have established the characteristic curve shown in FIG. 5, which indicates on the Y-axis the thermal state of the machine, namely the temperature measured on the iron of the stator body, that is to say on the packet of metal sheets constituting the body of the stator, or at the diodes of the bridge rectifiers, and on the X-axis the ratio R of the number of turns on the two windings. The X-axis also carries various ratios or pairs of turns that can be envisaged according to the two conditions and taking into account the fact that each number of turns must be an integer number. Thus the X-axis carries the ratios that can be envisaged for numbers of turns on the star winding 2, 3, 4. It can be seen that the curve has the form of a bell opening towards the top, with a minimum value between the ratios 5/3 and 7/4, where the ratio of the optimum value is $\sqrt{3}$. The thermal degradation to the right of the value $\sqrt{3}$ when the number of turns on the star winding increases is explained by the fact that the leading-out wire, which has then become large, does not allow the cooling air to pass, which has been able to be measured in the form of an increase in the temperature of the stator ion. To the left of the value $\sqrt{3}$ the thermal situation degrades because, for a number of star winding turns equal to 2, it is necessary to associate four delta winding turns, which gives rise to a ratio of 2 instead of the optimum ratio $\sqrt{3}$. This ratio far different from the optimum value causes an imbalance in the electrical system, which manifests in the form of an increase in the temperatures at the diodes of the bridge rectifiers.

Consequently, it has turned out that a winding configuration comprising in each recess three star winding turns and five delta winding turns is particularly advantageous.

It was indicated above that the composite winding stator device, that is to say partly star and partly delta, must also comply with the conditions that the ratio of the resistance of the delta winding must be equal to the resistance of the star winding multiplied by $1/\sqrt{3}$. In order to get close to this optimum ratio of $1/\sqrt{3}$, the invention proposes to use delta winding and star winding wires of different diameters. An optimisation of the thermal conditions under which the machine can function is obtained if it is ensured that the fill coefficient of the recess is greater than or equal to 50%, and the diameters of the wires is as large as possible in order to ensure good ventilation of the leading-out wires. However, given that the fitting of the turns in the recesses is easier for wires with a smaller diameter, provision is made to produce the turns of the star winding by means of parallel wires. However, the number of parallel wires must be as small as possible in order to ensure good ventilation of the leading-out wires.

It has proved, in the context of the invention, to be particularly advantageous to produce the three-phase winding in delta mode, that is to say each arm of this winding with a wire with a first diameter, and the three-phase winding in star mode, that is to say each arm of this winding with two wires in parallel with a second diameter wound in distributed mode. For the record it should be stated that a winding in distributed mode consists of winding the wire in the recesses of the stator body in one circumferential direction and then, after one turn of the stator body, winding the wire in the recesses of the stator body in the other circumferential direction.

Here, with the star winding, for each arm thereof, three turns of the stator body are made in the notches thereof with two wires in parallel, that is to say two wires in hand, and with the delta winding five turns of the stator body are made in the notches thereof.

Each arm therefore comprises respectively three and five turns.

By applying this arrangement to the particularly advantageous pair of five three-phase delta winding turns and three three-phase star winding turns in each recess of the stator, the configuration shown in FIG. 3 is obtained with six wires of a star winding arm, at two wires per turn, at the bottom of the recess under the five turns, that is to say the five wires, of a delta winding arm.

By way of example, in a composite winding stator device without parallel wire arrangements, the delta winding could be produced with a 1.6 mm wire and the star winding with a 2.24 mm wire. The production in parallel of the turns of the star winding could allow the use, for the star winding wires and the dealt winding wires, of wires with diameters respectively of 1.6 mm and 1.7 mm.

It should be noted that the arrangement of the delta winding wires close to the opening 36 of the recesses 35 and the star winding wires in the bottom of the recesses provides a good balance in terms of electrical output. However, in order to improve the thermal conditions and to reduce the noise of the machine, it is advantageous to place the star winding wires at the opening of the recesses, in distributed mode, as the delta winding wires at the bottom of the recesses.

Figure 4:
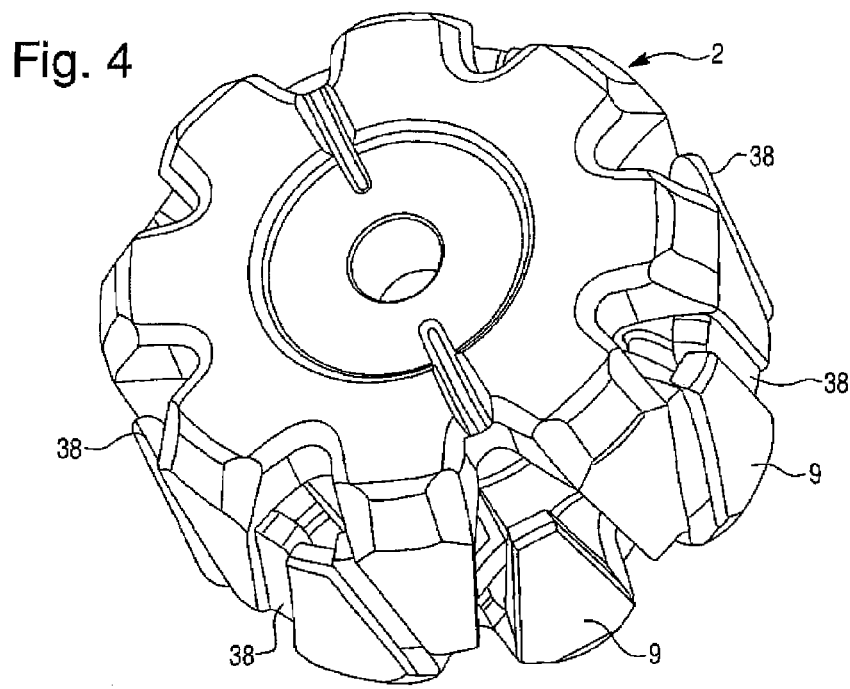
FIG. 4 is a perspective view of a rotor of a rotary electrical machine according to the invention.

The performance, namely the power and the efficiency, of a machine according to the invention can be increased further by using a rotor having the configuration according to FIG. 4. This rotor comprises, in a fashion known per se and for example described in French patent number 2 784 248, interposed between two adjacent teeth 9 at the periphery of the stator such as the stator 2 according to FIG. 1, a certain number of permanent magnets 38, choosing the number of these magnets so that it is less than the number of rotor poles and so that their arrangement is symmetrical with respect to the axis of the rotor. This provision of the invention is also applicable to rotors of the projecting pole type.

In FIG. 4 four pairs of magnets 8 for eight pairs poles are provided.

It should be noted that it is also advantageous in the context of the invention to provide, at the external periphery of the stator body, in the form of a packet of metal sheets, an elastic system for filtering the vibrations, with, in front, a flat seal 40 and, at the rear, pads 41, flexible heat-conductive resin being interposed between the front bearing and the body of the stator in order to discharge the heat, as can be seen in FIG. 1.

It is clear from the above description that the invention procures, compared with the prior art, many advantages, such as an improvement in the specific output, a reduction in magnetic noise and in the ripple factor. These advantages are obtained by virtue of the offset of 30 electrical degrees between the two star and delta windings in the stator whilst complying with a ratio of the number of turns of $\sqrt{3}$ and a ratio in the resistance of the windings of $1/\sqrt{3}$. The machine is in FIG. 1 cooled by air by a front fan and a more powerful rear fan. The power of the machine can also be increased by using higher performance fans such as fans obtained by the superimposition of two unit fans each comprising a series of blades as described for example in the document FR A 2 741 912 and as can be seen in FIG. 1 (rear fan). The diameter of the wire of the star winding is different from the diameter of the wire of the delta winding. The star winding could be wound with two wires in hand and the delta winding with one wire in hand. The star winding is wound in distributed mode and the wires used are round wires in order to improve the cooling of the leading-out wires of the stator. A cross section of the wire is greater than or equal to 1.5 mm. The position of the phases in the leading-out wire could be alternated.

In order to improve further the cooling of the leading-out wires, windings with a different axial height at the leading-out wires are provided. Thus one of the windings, preferably the one situated close to the bottoms of the recesses, extends in axial projection with respect to the other winding at each leading-out wire. In this case, the star winding is placed in the bottom of the recesses.

What is claimed is:

1. A multiphase rotary electrical machine comprising:
   bridge rectifiers;
   a stator disposed within a casing, the stator comprising a stator body having recesses: and
   a rotor surrounded by the stator;
   the stator further comprising a three-phase star winding and a three-phase delta winding, the outputs of the star winding and three-phase delta winding being connected to the bridge rectifiers connected to each other in parallel between earth and a common output terminal;
   the two windings being received together in the recesses in the stator body;
   the ratio of the number of turns of the windings in the star winding and the delta winding is chosen so that the number of turns in each winding is an integer number, whilst keeping the ratio of these numbers of turns as close as possible to $\sqrt{3}$ and as small as possible;

wherein the number of turns on the star winding and the number of turns on the delta winding are respectively 3 and 5, wherein the diameter of the wire in the star winding is different from the diameter of the wire in the delta winding such that the diameters are chosen so that the ratio of the transverse sections of the two windings is close to the value $\sqrt{3}$, and such that the diameters of the star and delta stator windings are chosen so as to obtain a fill factor of the recesses in the stator greater than 50%, and wherein the star winding is formed by two wires in parallel wound in distributed mode.

2. A multiphase rotary electrical machine comprising:

bridge rectifiers;

a stator disposed within a casing, the stator comprising a stator body having recesses: and a rotor surrounded by the stator;

the stator further comprising a thee-phase star winding and a three-phase delta winding, the outputs of the star winding and thee-phase delta winding being connected to The bridge rectifiers connected to each other in parallel between earth and a common output terminal;

the two windings being received together in the recesses in the stator body;

the ratio of the number of turns of the windings in the star winding and The delta winding is chosen so that the number of turns in each winding is an integer number, whilst keeping the ratio of these numbers of turns as close as possible to $\sqrt{3}$ and as small as possible;

wherein the number of turns on the star winding and the number of turns on the delta winding are respectively 3 and 5, and wherein the turns on the star winding in a stator recess are disposed at the opening of the recess in distributed mode, whilst the turns on the delta winding are situated in the bottom of the recess.

3. The machine according to claim 2, wherein the diameter of the wire in the star winding is different from the diameter of the wire in the delta winding such that the diameters are chosen so that the ratio of the transverse sections of the two windings is close to the value $\sqrt{3}$, and such that the diameters of the star and delta stator windings are chosen so as to obtain a fill factor of the recesses in the stator greater than 50%.

4. The machine according to claim 2, wherein the diameter of the wire in the star winding is different from the diameter of the wire in the delta winding such that the diameters are chosen so that the ratio of the transverse sections of the two windings is close to the value $\sqrt{3}$, and such that the diameters of the star and delta stator windings are chosen so as to obtain a fill factor of the recesses in the stator greater than 50%, and wherein the star winding is formed by two wires in parallel wound in distributed mode.

* * * * *